US012695278B2

(12) United States Patent
Schnelle

(10) Patent No.: US 12,695,278 B2
(45) Date of Patent: Jul. 28, 2026

(54) PULL STRING VACUUM ASSEMBLY

(71) Applicant: Travis Paul Schnelle, Springfield, MO (US)

(72) Inventor: Travis Paul Schnelle, Springfield, MO (US)

(73) Assignee: Travis Paul Schnelle, Springfield, MO (US)

( * ) Notice: Subject to any disclaimer, the term of this patent is extended or adjusted under 35 U.S.C. 154(b) by 349 days.

(21) Appl. No.: 18/437,766

(22) Filed: Feb. 9, 2024

(65) Prior Publication Data
US 2025/0260216 A1 Aug. 14, 2025

(51) Int. Cl.
| | |
|---|---|
| *H02G 1/00* | (2006.01) |
| *F16L 41/08* | (2006.01) |
| *H02G 1/08* | (2006.01) |
| *H02G 3/08* | (2006.01) |

(52) U.S. Cl.
CPC .............. *H02G 1/086* (2013.01); *F16L 41/08* (2013.01); *H02G 3/081* (2013.01)

(58) Field of Classification Search
CPC ................................. H02G 1/08; H02G 1/086
See application file for complete search history.

(56) References Cited

U.S. PATENT DOCUMENTS

| | | | | |
|---|---|---|---|---|
| 5,582,199 | A | * | 12/1996 | Schmidt .................. D06F 39/08 |
| | | | | 248/68.1 |
| 7,397,002 | B2 | | 7/2008 | Largo |
| 11,221,116 | B1 | * | 1/2022 | Barber .................... F21S 8/083 |
| 11,788,636 | B2 | * | 10/2023 | Huang .................... F17C 13/04 |
| | | | | 285/305 |
| 2007/0269271 | A1 | | 11/2007 | Smith, II et al. |
| 2009/0007971 | A1 | * | 1/2009 | Ball ...................... E04G 15/061 |
| | | | | 137/315.12 |
| 2010/0206408 | A1 | * | 8/2010 | Krohn ..................... B67C 11/04 |
| | | | | 137/602 |
| 2013/0025707 | A1 | * | 1/2013 | McPhail ................. E03C 1/042 |
| | | | | 137/360 |
| 2016/0069513 | A1 | * | 3/2016 | Knoll ...................... F16N 31/00 |
| | | | | 137/15.14 |
| 2025/0260216 | A1 | * | 8/2025 | Schnelle ................ H02G 1/086 |
| 2026/0010068 | A1 | * | 1/2026 | Chiu ......................... G03F 1/66 |

* cited by examiner

*Primary Examiner* — Lee D Wilson

(57) ABSTRACT

A pull string management system. The Pull String Vacuum Assembly that includes a cover plate which encompasses a junction box and a port which coincides with a standard shop vac hose is provided. The cover plate is constructed in such a way as to fit over a junction box and utilizes a seal to create a vacuum over the entirety of a junction box for the purpose of moving pull string or wire through new or existing conduit. The port is constructed in such a way as to coincide with a standard shop vacuum hose and requires no additional attachments or modifications.

12 Claims, 13 Drawing Sheets

1

23

24

25

23    26

24

PULL STRING VACUUM ASSEMBLY

FIELD OF THE INVENTION

The present invention generally relates to the management of pull string or wire through conduit using a vacuum method and more particularly to an apparatus for such a purpose.

BACKGROUND OF THE INVENTION

The installation of junction boxes for electrical and low volt writing requires the use of conduit to meet certain building construction codes. Traditionally, the wiring is fed through the conduit by attaching it to flexible sticks, known as fish sticks in the industry, or long fish tape. The flexible nature of the fish sticks and fish tape allows for most general management of wire through the conduit. As the need for new wiring in an existing system emerges, the use of fish sticks or fish tape is less ideal due to the pre-existing wiring in the conduit which reduces the amount of space within the conduit. The use of fish sticks or fish tape is also less ideal in conduit that contains elbows, up to an angle of ninety degrees, as the flexibility and small area to bend prevents the fish sticks or fish tape from moving forward. Further disadvantages exist with this traditional method due to the potential for exceptionally long lengths of conduit through which the wiring must pass. The number of fish sticks that can be connected together is not limited, but after several sticks are connected together, the maneuverability of those sticks become burdensome. Managing a large amount of fish tape can also be cumbersome. There is also a cost disadvantage with a large number of fish sticks for jobs of great length.

Newer systems for moving wire through conduit have emerged which include the use of pull string and vacuum system or a compressed air system. Prior art search resulted in two systems that attempted to make improvements in the field. Largo, U.S. Pat. No. 7,397,002 B2, requires the use of a standard shop vacuum system attached to the conduit inside a junction box. The disadvantage of this system is that it requires a modification of the shop vacuum hose and does not allow for an airtight seal with the conduit. Another disadvantage of this system exists in junction boxes with existing wiring, the space inside the junction box would be preventative in getting the modified shop vacuum attachment inside the junction box.

Additional prior art, Smith, II et al. US 2007/0269271 A1, suggests using compressed air or a vacuum system to move wire through a conduit by use of a device, known as a "mouse" in the industry, which is connected to a wire or pull string. A blast of air into the conduit could move the mouse provided there were no other obstructions within the conduit. The disadvantages of this system are numerous. Compressed air cannisters extinguish rapidly thereby potentially not allowing the process to be completed. A large amount of compressed air cannisters can be costly. In conduit in which there is existing wiring, the space for the mouse would be preventative and would not allow the mouse to move through the conduit easily whether compressed air or a vacuum system is utilized and still does not resolve the issue with attaching suction device to the conduit and junction boxes.

Therefore, there is a demand for a system or apparatus to move pull string or wire through new conduit, or through conduit with existing wiring, that does not require additional devices or modifications to standard shop vacuums. A solution to these issues facing those in the industry is a device that uses a standard shop vacuum system with no modifications and which can be attached to the entirety of the installed junction boxes, creating an airtight seal by which to pull, or vacuum, a pull string or wire through new conduit or conduit with existing wiring.

SUMMARY OF THE INVENTION

Due to the disadvantages known in the prior art the present invention provides a Pull String Vacuum Assembly which creates a method of moving pull string or wire through conduit easier than existing inventions propose to do. The system includes a cover plate which coincides with standard junction boxes and a port which coincides with standard shop vacuum hose sizes with no modifications necessary.

In one embodiment of the disclosure a novel adapter is provided for connecting a vacuum source to a junction box or conduit which consists of a cover plate with a circular opening. The reverse side of the cover plate has attached a gasket of tubular rubber, or other non-limiting material such as vinyl or silicone, with the exception of the circular opening, to create a near airtight seal when placed over the junction box. The advantage to this system is the non-limiting size of the cover plate to accommodate any junction box in use in the industry. An additional advantage of this system is the use of tubular rubber, or other non-limiting material to create a near airtight seal.

In a still further embodiment of the disclosure, the exterior or face of the cover plate allows for a flange that is designed to accommodate a stepped attachment piece with various size flanges to accommodate any shop vacuum hose in use in the industry. The advantage of this portion of the system is that no modification to the shop vacuum hose is necessary as the various sizes of flange attachment are designed to accommodate any shop vacuum hose in use in the industry. This has the additional advantage of further creating a near airtight seal between the shop vacuum hose, attachment and cover plate.

In a still further embodiment of the disclosure, the inside portion of the flanged attachment is constructed to accommodate various sizes of conduit in use in the industry. The advantage of this portion of the system is that the flanged attachment can be used separately from the cover plate to fit directly on to conduit where no junction box is in place. A further advantage is that the fittings between the conduit and the inner portion of the flanged attachment allow for a near airtight seal.

In a still further embodiment of the disclosure, the flanged attachment is made of clear pvc plastic, or other material, as such as in use in pneumatic tubes used for financial institution drive thru tubes. The advantage of this portion of the system is that the user can see the wire or pull string as it reaches the vacuum.

In a still further embodiment of the disclosure an additional novel oversized adapter plate is provided for connecting a vacuum source to larger, oversized junction boxes, such as a floor box, in use in the industry today. The oversized adapter plate is constructed in the same manner as the smaller adapter plate with a circular opening in the center, a flange to accommodate the flanged adapter, and tubular rubber or other non-limiting material such as vinyl or silicone, on the reverse size of the cover plate, with the exception of the circular opening, to create a near airtight seal when placed over the oversized junction box. The advantage to this system is the non-limiting size of the cover plate to accommodate any oversized junction box in use in the industry. An additional advantage of this system is the use of tubular rubber, or other non-limiting material to create a near airtight seal.

The user slides the flanged attachment over the flange on the cover plate and presses the cover plate over the opening of the junction box which creates an airtight seal around the junction box as a result of the tubular rubber gasket. The user then slides the shop vacuum hose over the correct size of the flanged attachment which ensures a near airtight seal due to the snug fit. The user then plugs in the shop vacuum to a power source and turns on the shop vacuum. The near airtight seal that is created allows for the suction of the shop vacuum to move a pull string or wire through the conduit. The advantage of this portion of the system is the airtight seal is assured. Another advantage of this portion of the system is the design of the flanged attachment to accommodate any shop vacuum hose in use in the industry without the need for any modifications or attachments to the shop vacuum hose. A still further advantage of this system is that it can be utilized despite existing wiring in the conduit as all attachments are on the exterior of the junction box.

In a still further embodiment of the disclosure, a novel flexible conduit adapter is provided to work directly with conduit, where no junction box is presently installed, and that is located close to a wall structure in which there is little movement or flexibility of the conduit away from the wall structure. The flexible conduit adapter is made of clear pvc plastic, or other material, as such as in use in pneumatic tubes used for financial institution drive thru tubes. The flexible conduit adapter has one end that fits into the flanged adapter and the other end consists of stepped flanges that are designed to fit into conduit in use in the industry. The flexible conduit adapter has the advantage of providing a flexible bend in the elbow portion of the adapter to allow the user to work in tight spaces at various angles. A still further advantage of this portion of the system is that the user can see the wire or pull string as it reaches the vacuum. A still further advantage of this portion of the system is that the stepped flanges are made to accommodate various sizes of conduit in use in the industry.

Although specific features, structures, embodiments, methods, objectives, benefits, advantages, functionality, and applications may have been disclosed, it will be understood by those having skill in the art that changes, including but not limited to, variations, modifications, combinations, alterations, omissions, and various other applications, will occur to those of ordinary skill in the art and such changes will be made without departing from the spirit and the scope of the invention as claimed. It should also be understood by anyone who reads this document that the terminology and phraseology used herein are for the purpose of description and should not be considered limiting.

BRIEF DESCRIPTION OF THE DRAWINGS

The object, features and advantages of the present invention will become more apparent by describing the preferred embodiments with reference to the accompanying figures, in which.

Corresponding reference characters indicate corresponding parts throughout the drawings. The exemplification set of characters herein is not to be construed as limiting the scope of the invention in any manner.

DETAILED DESCRIPTION OF THE INVENTION

Embodiments of the present invention will now be described in detail with reference to the accompanying drawings, in which like reference numbers designate identical or corresponding elements in each of the different views. It is to be understood that changes can be made to these embodiments without departing from the spirit or the scope of the invention. Additionally, any details set forth in this specification are not intended to be limiting and instead simply set forth some of the many possible embodiments for the invention as claimed.

Figure 1:
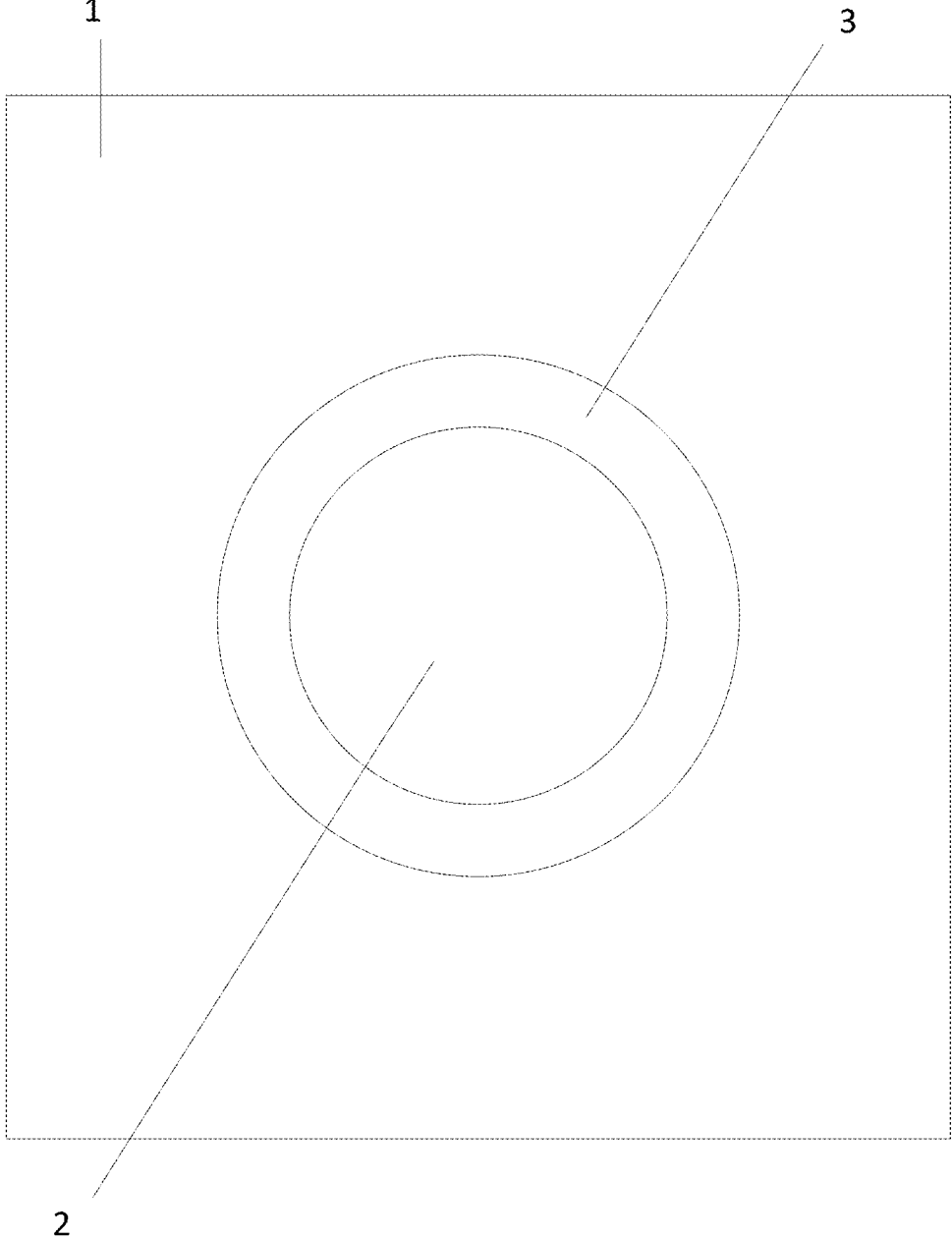
FIG. 1 illustrates a front orthogonal view of the cover plate of the Pull String Vacuum Assembly in accordance with an embodiment of the present invention.

In one aspect, FIG. 1 shows an embodiment of the cover plate (1) of non-limiting material but can be made of pvc plastic with an overall dimension of at least 20.32 cm (eight inches) in height and at least 20.32 cm (eight inches) in width. The overall size is non-limiting and can be as large as any junction box used in the industry. The exterior or face of the cover plate (1) allows for a circular opening (2) of at least 10.16 cm (four inches) in diameter. The opening has a flange (3) centered over the circular opening (2) that is at least 1.27 cm (one half inch) in height protruding out from the cover plate (1), as one solid piece, and at least 0.3178 cm (one-eighth inch) in overall thickness and at least 10.795 cm (four and one quarter inches) in diameter and is non-limiting in size.

Figure 2:
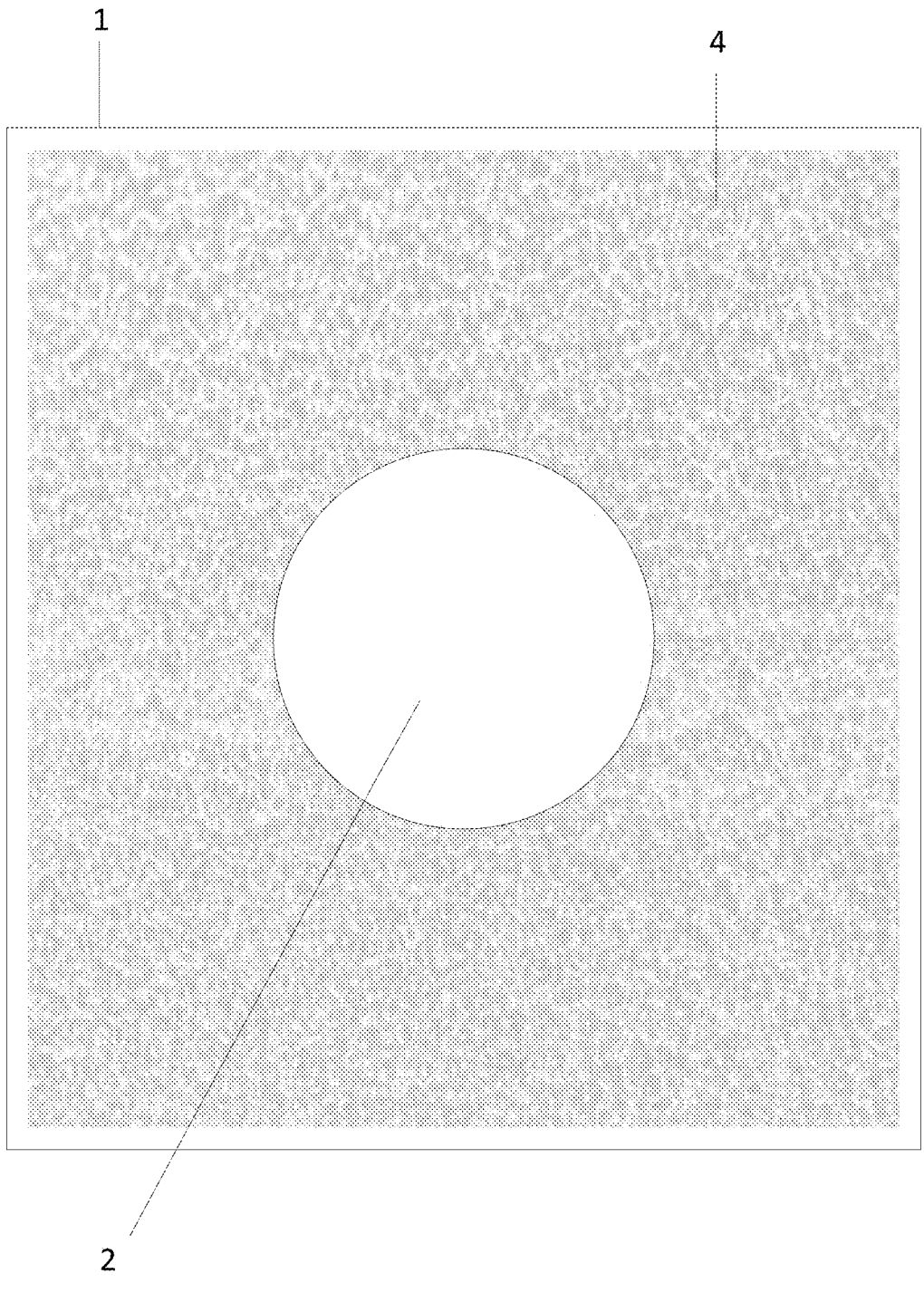
FIG. 2 illustrates a rear orthogonal view of the cover plate of the Pull String Vacuum Assembly in accordance with an embodiment of the present invention.

Referring to FIG. 2, the inner portion of the cover plate (1) is shown in rear orthogonal view and has attached to it on the entirety of the surface, a tubular rubber gasket (4), or other non-limiting material such as vinyl or silicone, and at least 20.0025 cm (seven and seven-eighths inches) in height and at least 20.0025 cm (seven and seven-eighths inches) in width, to create a near airtight seal when placed over a junction box. The tubular rubber gasket (4) is attached to the rear portion of the cover plate (1) by industrial strength adhesive to maintain the integrity of the connection between the tubular rubber gasket (4) and cover plate (1). The tubular rubber gasket (4) can be at least 1.27 cm (one half inch) in overall thickness but is non limiting in overall thickness. A near airtight seal is created as the cover plate (1) and tubular rubber gasket (4) is pressed onto the face of a junction box allowing the tubular rubber gasket (4) to compress around the sides of a junction box. The tubular rubber gasket (4) has a negative space (2) on the inner portion of the cover plate (1) within the area of the tubular rubber gasket (4) corresponding to the opening on the cover plate of at least 10.16 cm (four inches) in diameter.

Figure 3:
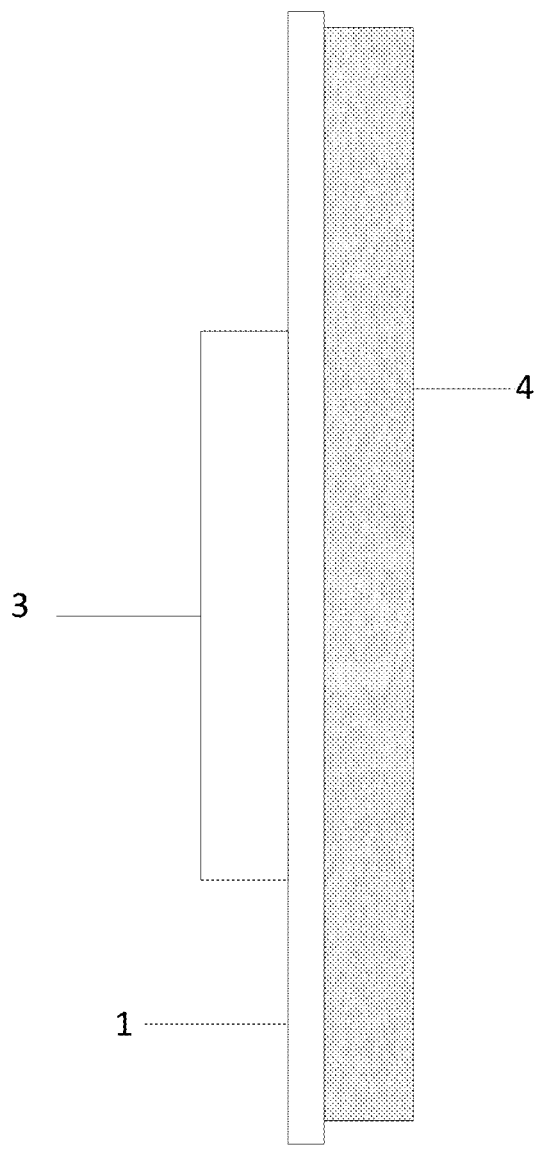
FIG. 3 illustrates a right side orthogonal view of the cover plate of the Pull String Vacuum Assembly in accordance with an embodiment of the present invention.

Referring to FIG. 3, the flange (3), cover plate (1) and tubular rubber gasket (4) is shown in side orthogonal view to demonstrate the overall thickness of at least 2.8575 cm (one and one-eighth inch).

Figure 4:
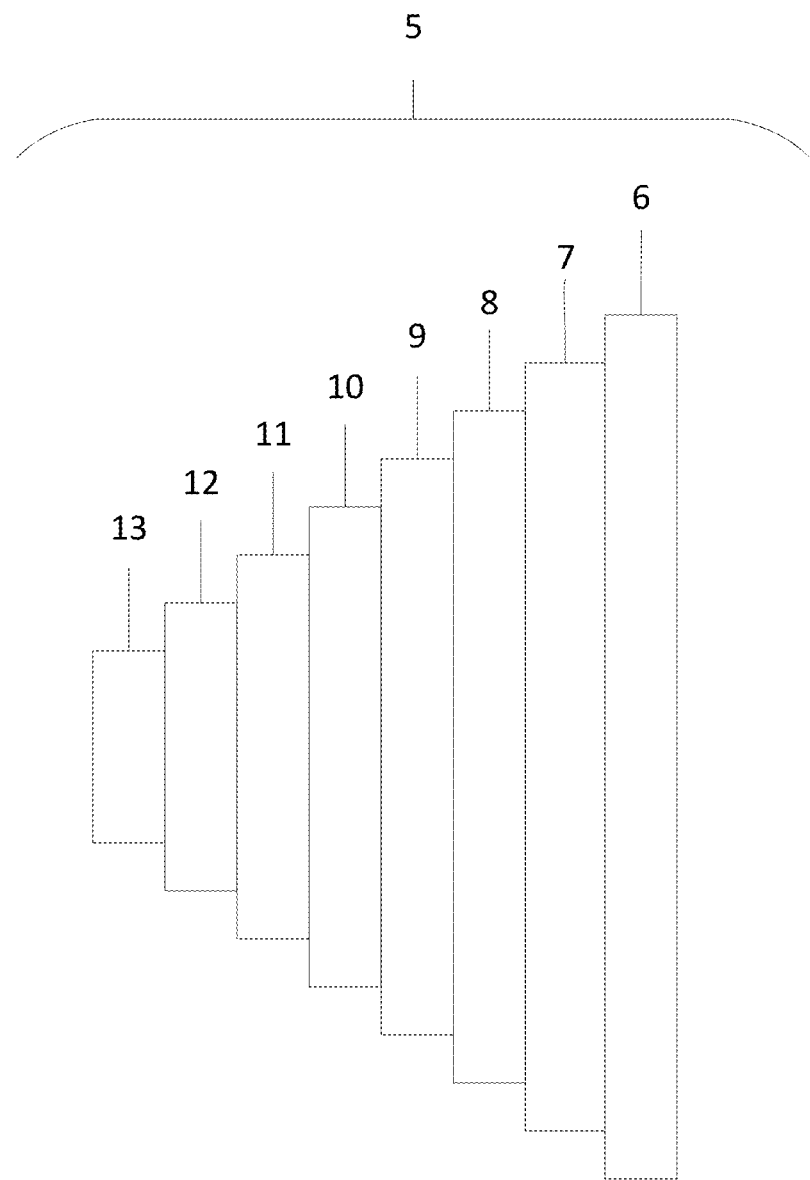
FIG. 4 illustrates a right side orthogonal view of the flanged adapter of the Pull String Vacuum Assembly in accordance with an embodiment of the present invention.

Referring to FIG. 4, the flanged adapter (5) is shown in side orthogonal view to demonstrate the variety of sizes of flanges (6,7,8,9,10,11,12,13) to accommodate any size of shop vacuum hose in use in the industry. Section 6 of the flanged adapter (5) is of non-limiting size and is at least 10.9537 cm (four and five-sixteenths) in diameter and at least 1.27 cm (one half inch) in height and is designed to fit over the flange (3) and become flush with the cover plate (1) to create a near airtight seal. Section 7 is at least 10.0012 cm (three and fifteen-sixteenths inches) in diameter and at least 1.27 cm (one half inch) in height and designed to accommodate a shop vacuum size of at least 10.16 cm (four inches) in diameter. Section 8 is at least 7.46125 cm (two and fifteen-sixteenths inches) in diameter and at least 1.27 cm (one half inch) in height and designed to accommodate a shop vacuum size of at least 7.62 cm (three inches) in diameter. Section 9 is at least 6.19125 cm (two and seven-sixteenths inches) in diameter and at least 1.27 cm (one half inch) in height and designed to accommodate a shop vacuum size at least 6.35 cm (two and one half inches) in diameter. Section 10 is at least 4.92125 cm (one and fifteen-sixteenths inches) in diameter and at least 1.27 cm (one half inch) in height and designed to accommodate a shop vacuum size of at least 5.08 cm (two inches) in diameter. Section 11 is at least 3.65125 cm (one and seven-sixteenth inches) in diameter and at least 1.27 cm (one half inch) in height and designed to accommodate a shop vacuum size of at least 3.81 cm (one and one half inches) in diameter. Section 12 is at least 3.01625 cm (one and three-sixteenths inches) in diameter and at least 1.27 cm (one half inch) in height and designed to accommodate a shop vacuum size of at least 3.175 cm (one and one quarter inches) in diameter. Section 13 is at least 2.54 cm (one inch) in diameter and at least 1.27 cm (one half inch) in height and designed to accommodate a shop vacuum size of at least 2.6924 cm (one and one-sixteenth inches) in diameter. The overall length of the flanged adapter (5) with all sections combined is at least 10.16 cm (four inches) and is made of non-limiting material but could be made of clear pvc plastic as in the same material used in pneumatic tubes used in the banking industry in their drive thru services. The use of clear pvc plastic gives the advantage of allowing the user to see the pull string or wire as it reaches the shop vacuum hose to prevent pulling too much of the pull string or wire into the vacuum machine.

Figure 4A:
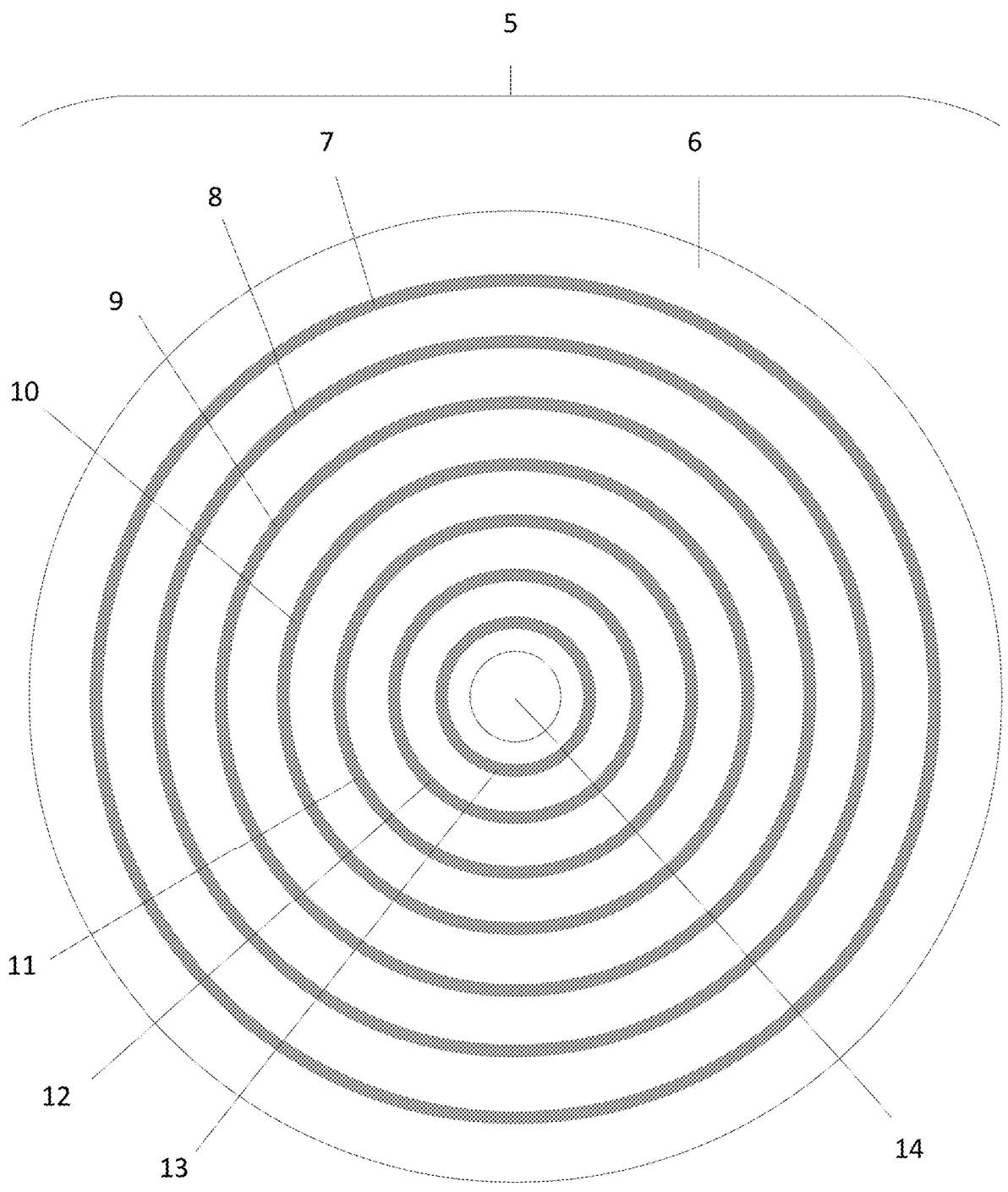
FIG. 4A illustrates a front orthogonal view of the flanged adapter of the Pull String Vacuum Assembly in accordance with an embodiment of the present invention.

Referring to FIG. 4A, the flanged adapter (5) is shown in front orthogonal view to demonstrate the variety of sizes of flanges (6,7,8,9,10,11,12,13) to accommodate any size of shop vacuum hose in use in the industry.

Figure 4B:
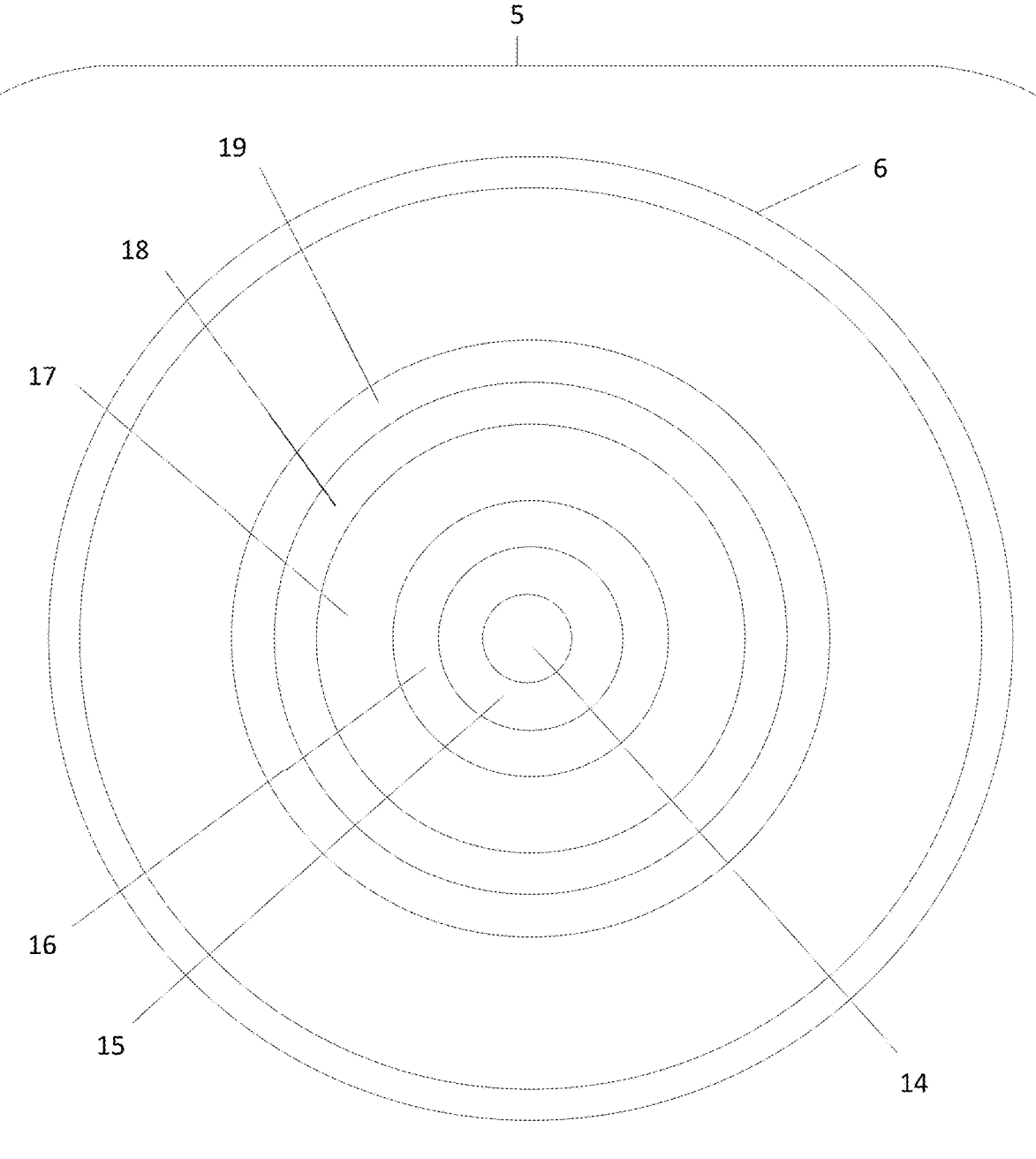
FIG. 4B illustrates a rear orthogonal view of the flanged adapter of the Pull String Vacuum Assembly in accordance with an embodiment of the present invention.

Referring to FIG. 4B, in another embodiment, the flanged adapter (5) is shown in rear orthogonal view. The design of the inner portion of the flanged adapter (5) is to accommodate various sizes of conduit in use in the industry where a junction box may not be present. Section 14 in the center of the flanged adapter (5) is at least 1.42875 cm (nine-six-teenths inch) in diameter and at least 1.27 cm (one half inch) in height to accommodate conduit that is 1.27 cm (one-half inch) in diameter. Section 15 of the flanged adapter (5) is at least 2.06375 cm (thirteen-sixteenths inch) in diameter and at least 1.27 cm (one half inch) in height to accommodate conduit that is 1.905 cm (three-fourths inch) in diameter. Section 16 of the flanged adapter (5) is at least 2.69875 cm (one and one-sixteenths inch) in diameter and at least 1.27 cm (one half inch) in height to accommodate conduit that is 2.54 cm (one inch) in diameter. Section 17 of the flanged adapter (5) is at least 3.96875 cm (one and nine-sixteenths inch) in diameter and at least 1.27 cm (one-half inch) in height to accommodate conduit that is 3.81 cm (one and one-half inch) in diameter. Section 18 of the flanged adapter (5) is at least 4.60375 cm (one and thirteen-sixteenths inch) in diameter and at least 1.27 cm (one half inch) in height to accommodate conduit that is 4.445 cm (one and three-fourths inch) in diameter. Section 19 of the flanged adapter (5) is at least 5.23875 cm (two and one-sixteenths inch) in diameter and at least 1.27 cm (one-half inch) in height to accommodate conduit that is 5.08 cm (two inches) in diameter. The inner portion of the flanged adapter (5) is made of non-limiting material but could be made of clear pvc plastic as in the same material used in pneumatic tubes used in the banking industry in their drive thru services. The use of clear pvc plastic gives the advantage of allowing the user to see the pull string or wire as it reaches the shop vacuum hose to prevent pulling too much of the pull string or wire into the vacuum machine.

Figure 5A:
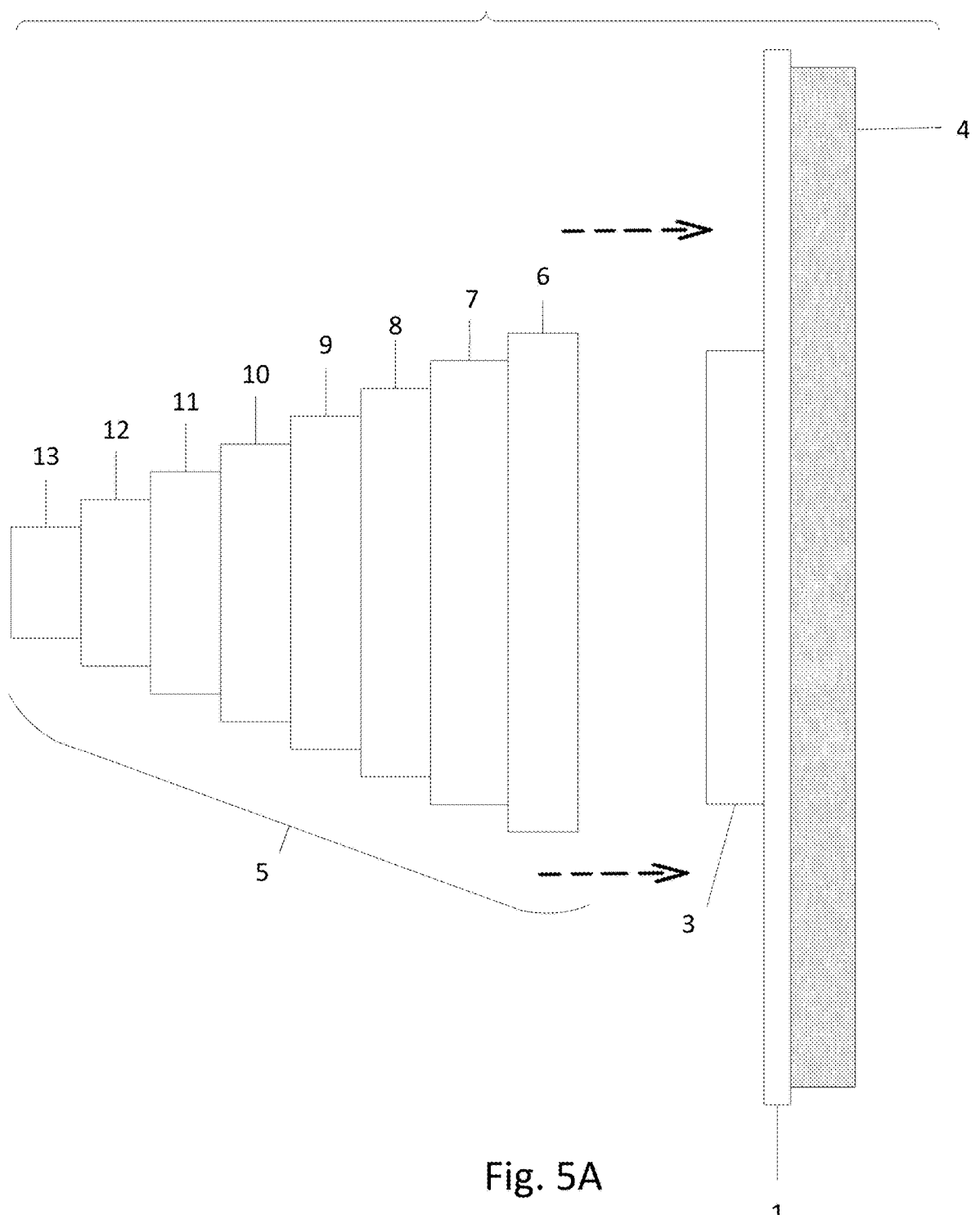
FIG. 5A illustrates a right side exploded view of the cover plate and flanged adapter of the Pull String Vacuum Assembly in accordance with an embodiment of the present invention.

Referring to FIG. 5A, the Pull String Vacuum Assembly is shown in exploded view to demonstrate the connection of the flanged adapter (5) to the cover plate (1).

Figure 5B:
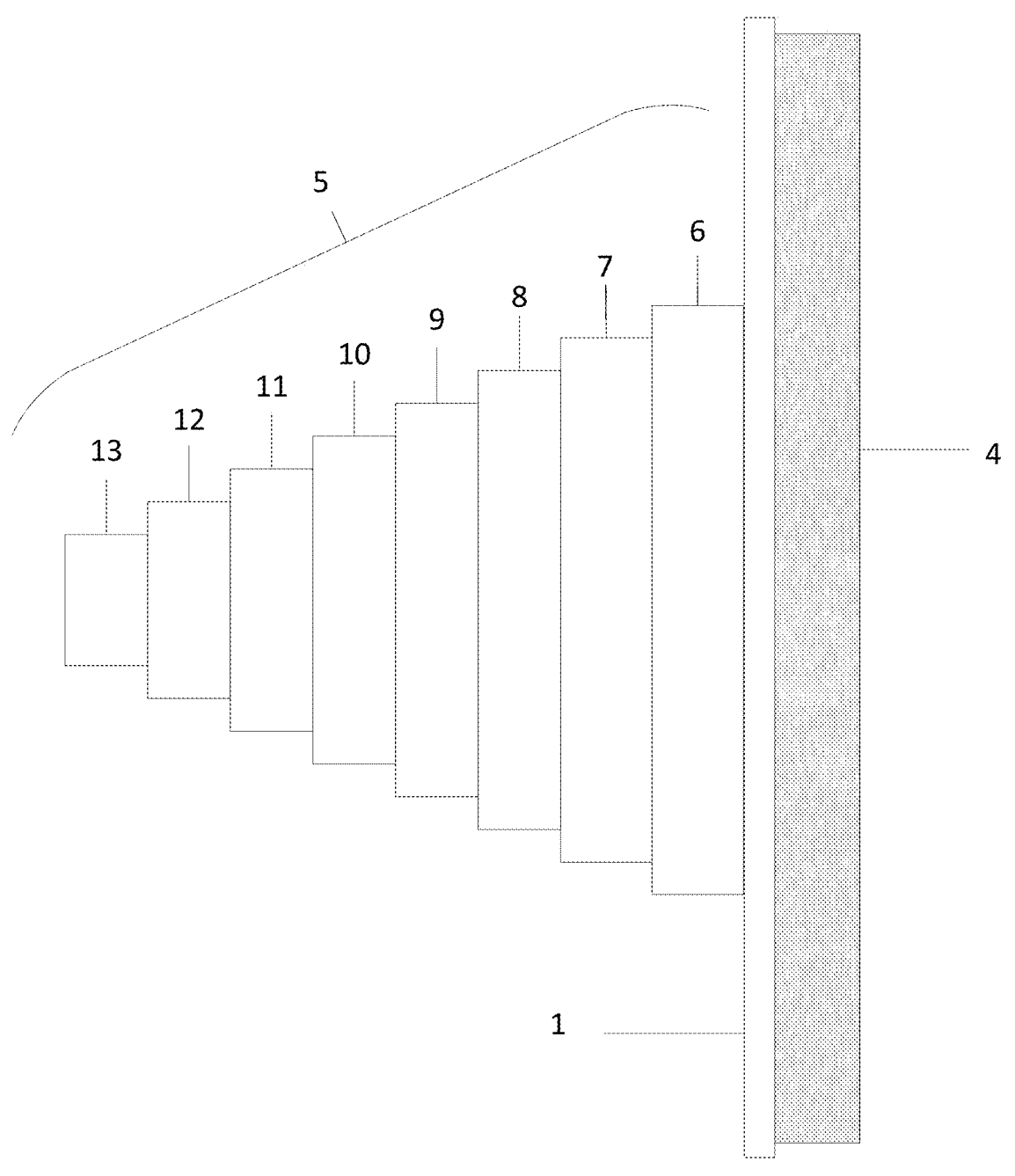
FIG. 5B illustrates a right side orthogonal view of the completed assembly of the Pull String Vacuum Assembly in accordance with an embodiment of the present invention.

Referring to FIG. 5B, the Pull String Vacuum Assembly in shown in side orthogonal view to demonstrate the completed connection between the flanged adapter (5) and the cover plate (1).

Figure 6A:
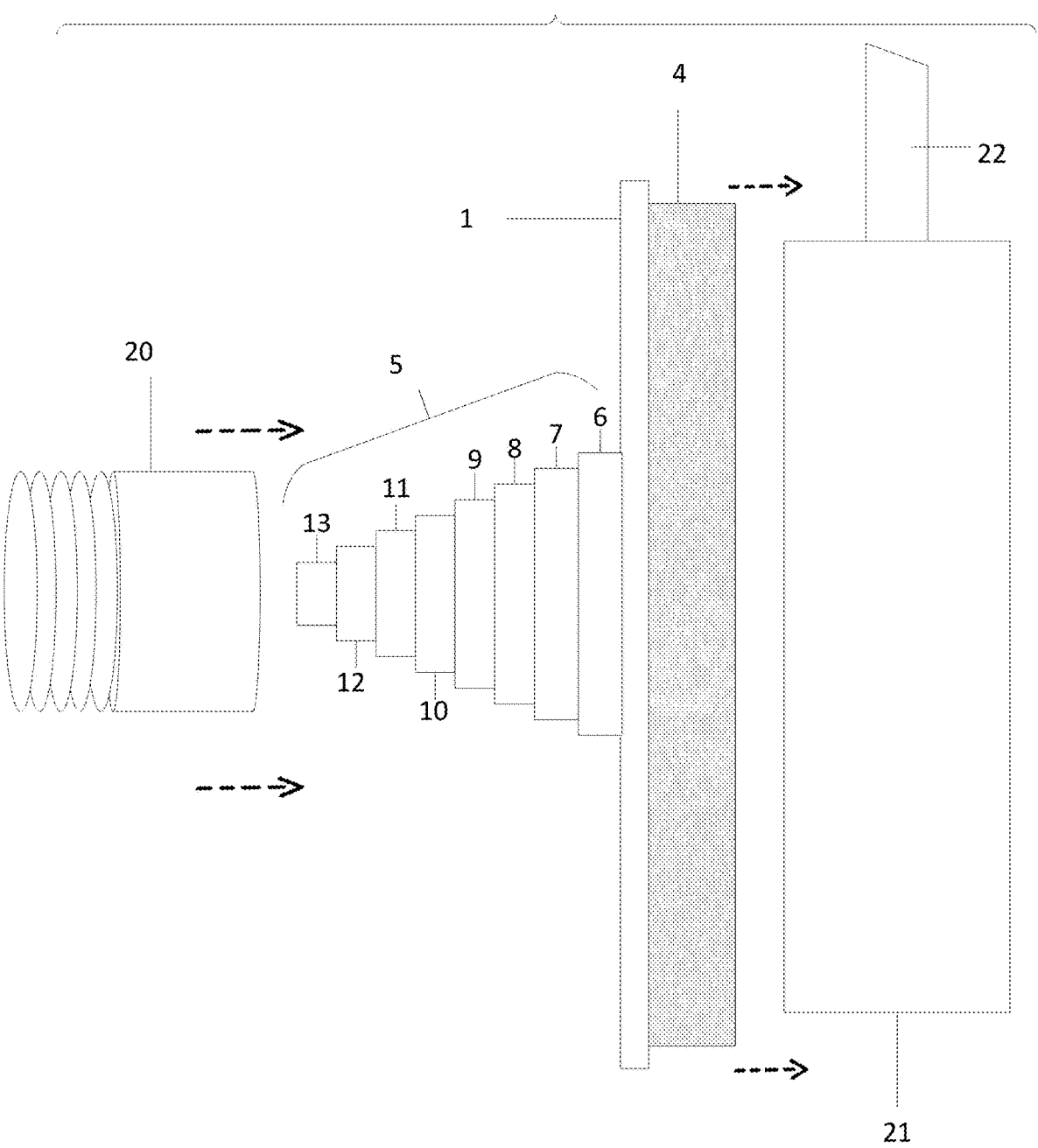
FIG. 6A illustrates a right side exploded view of the cover plate and flanged adapter of the Pull String Vacuum Assembly, shop vacuum hose, junction box and conduit in accordance with an embodiment of the present invention.

Referring to FIG. 6A, the Pull String Vacuum Assembly is shown in exploded view to demonstrate the connection of the flanged adapter (5), the cover plate (1) and tubular rubber gasket (4) to a junction box (21) with conduit (22) and the connection of a shop vacuum hose (20) to one of the sections of the flanged adapter (5).

Figure 6B:
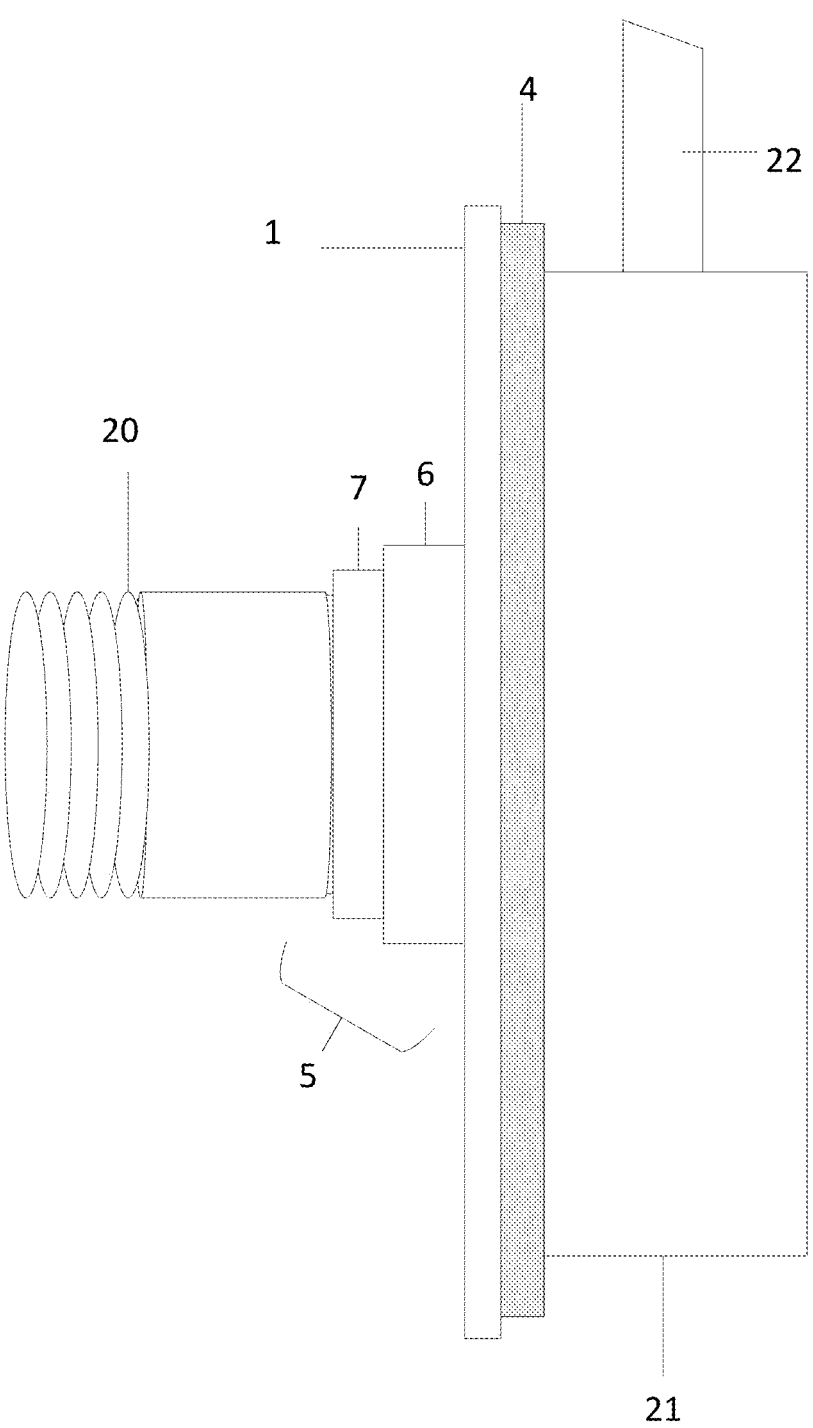
FIG. 6B illustrates a right side orthogonal view of the completed assembly of the Pull String Vacuum Assembly, shop vacuum hose, junction box and conduit in accordance with an embodiment of the present invention.

Referring to FIG. 6B, the Pull String Vacuum Assembly is shown in side orthogonal view to demonstrate the completed connection between a shop vacuum hose (20), a section of the flanged adapter (5), the cover plate (1), tubular rubber gasket (4) and junction box (21) with conduit (22).

Figure 7:
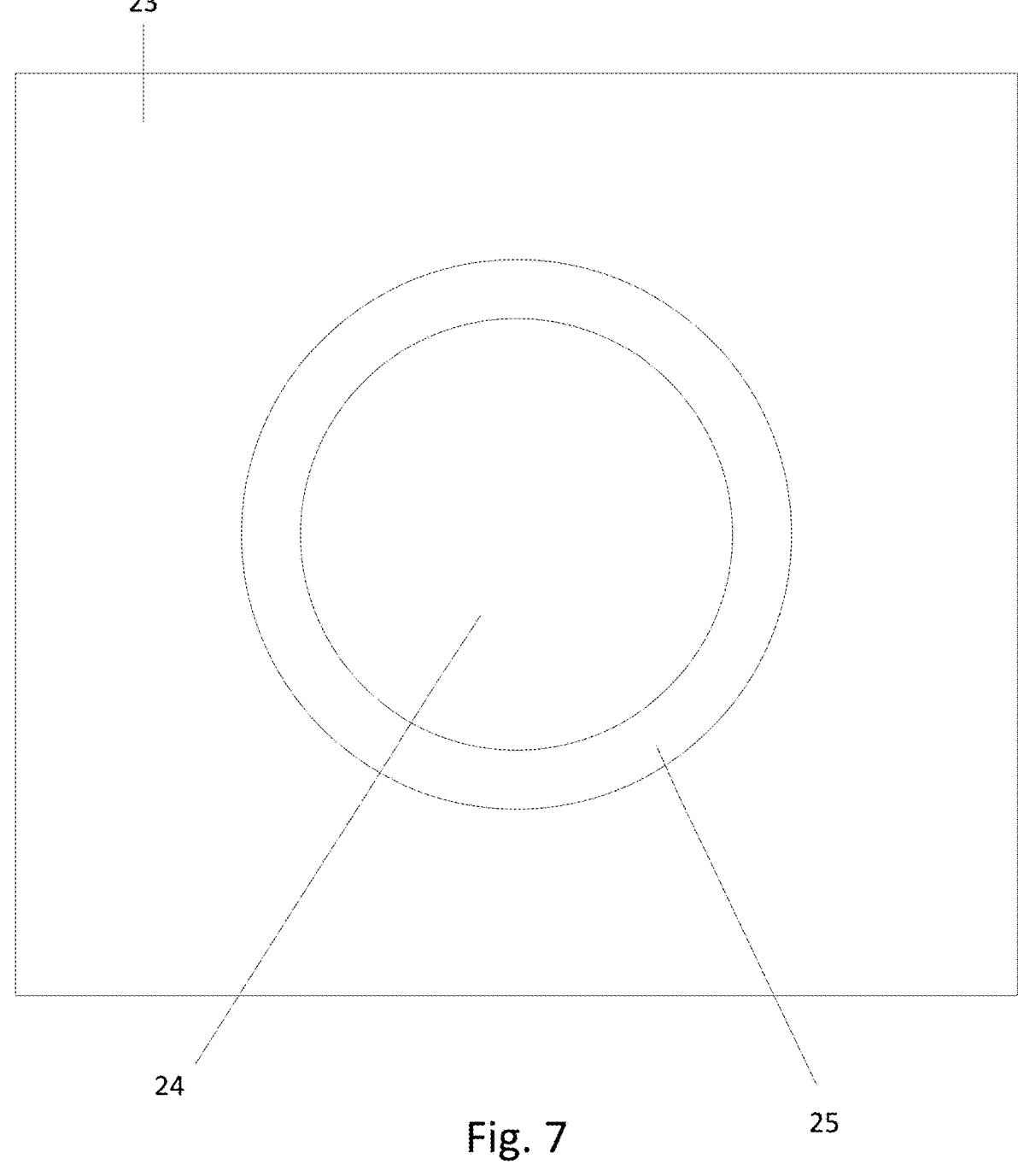
FIG. 7 illustrates a front orthogonal view of the oversized cover plate of the Pull String Vacuum Assembly in accordance with an embodiment of the present invention.

Referring to FIG. 7 another embodiment of the present design is shown in front orthogonal view. An oversized cover plate (23) of non-limiting material but can be made of pvc plastic, or other non-limiting material, with an overall dimension of at least 36.5252 cm (fourteen and three-eighths inches) in height and at least 36.5252 cm (fourteen and three-eighths inches) in width. The overall size is non-limiting and can be as large as any junction box used in the industry for floor installations. The exterior or face of the oversized cover plate (23) allows for a circular opening (24) of at least 10.16 cm (four inches) in diameter. The opening has a flange (25) centered over the circular opening (24) that is at least 1.27 cm (one half inch) in height protruding out from the oversized cover plate (23), as one solid piece, and at least 0.3178 cm (one-eighth inch) in overall thickness and at least 10.795 cm (four and one quarter inches) in diameter and is non-limiting in size.

Figure 8:
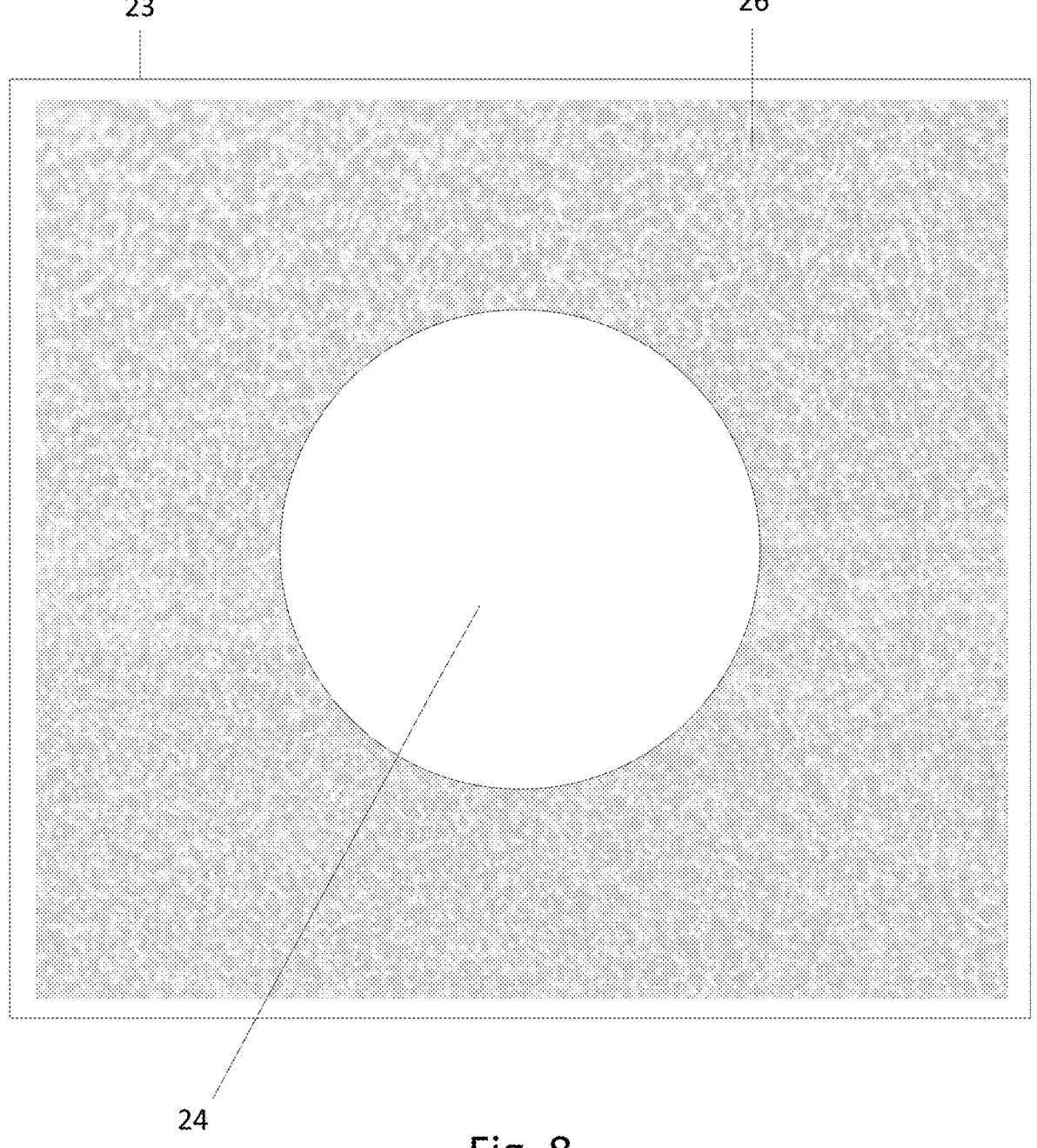
FIG. 8 illustrates a rear orthogonal view of the oversized cover plate of the Pull String Vacuum Assembly in accordance with an embodiment of the present invention.

Referring to FIG. 8 the inner portion of the oversized cover plate (23) is shown in rear orthogonal view and has attached to it on the entirety of the surface, a tubular rubber gasket (26), or other non-limiting material such as vinyl or silicone, and at least 36 cm (fourteen and three-sixteenths inches) in height and at least 36 cm (fourteen and three-sixteenths inches) in width, to create a near airtight seal when placed over a floor junction box. The tubular rubber gasket (26) is attached to the rear portion of the oversized cover plate (23) by industrial strength adhesive to maintain the integrity of the connection between the tubular rubber gasket (26) and oversized cover plate (23). The tubular rubber gasket (26) can be at least 1.27 cm (one half inch) in overall thickness but is non limiting in overall thickness. A near airtight seal is created as the oversized cover plate (23) and tubular rubber gasket (26) is pressed onto the face of a floor junction box allowing the tubular rubber gasket (26) to compress around the sides of a floor junction box. The tubular rubber gasket (26) has a negative space (24) on the inner portion of the oversized cover plate (23) within the area of the tubular rubber gasket (26) corresponding to the opening on the oversized cover plate of at least 10.16 cm (four inches) in diameter.

Figure 9:
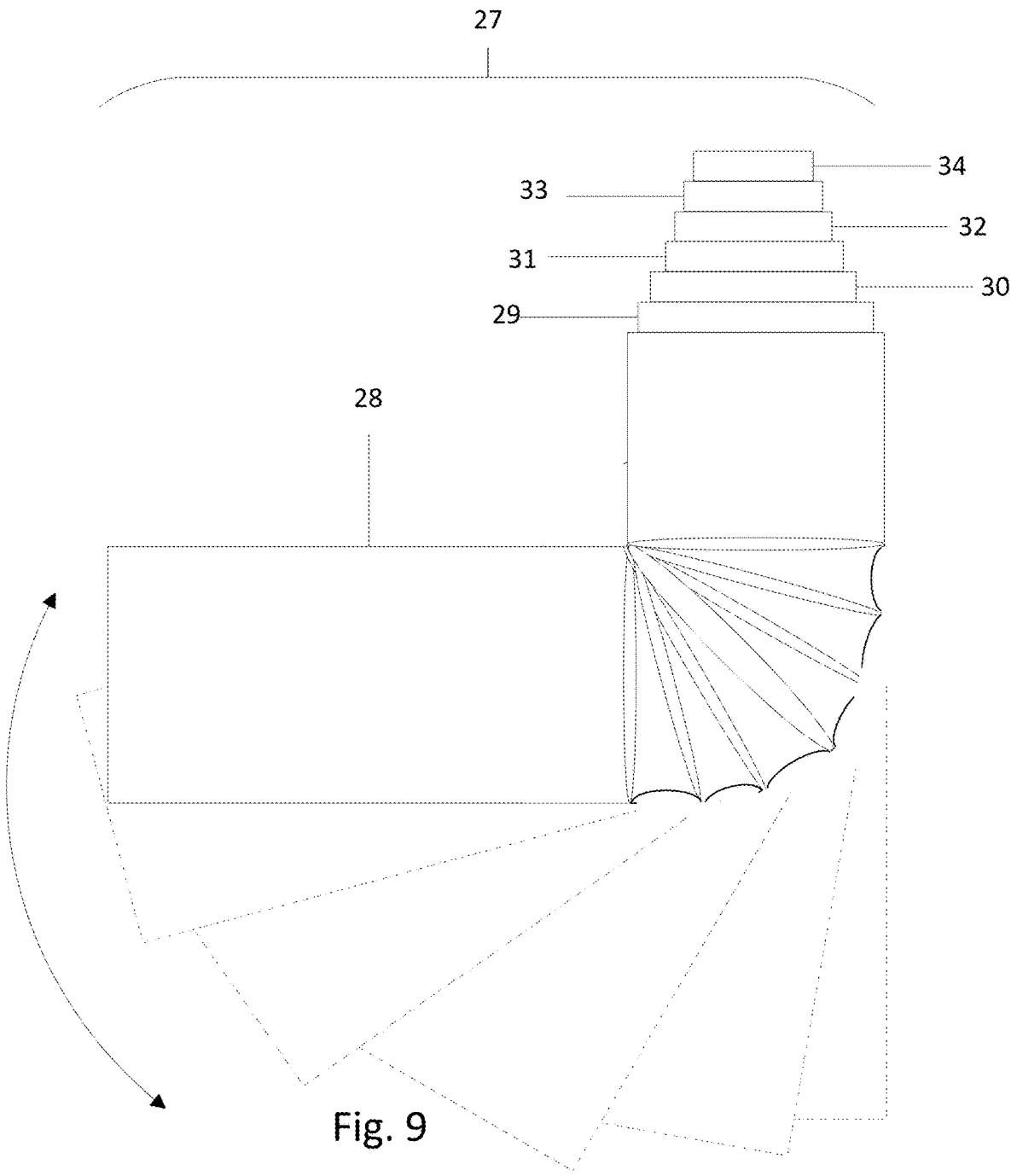
FIG. 9 illustrates a side orthogonal view of the flexible conduit adapter of the Pull String Vacuum Assembly in accordance with an embodiment of the present invention.

Referring to FIG. 9 another embodiment of the present design is shown in side orthogonal view. The flexible conduit adapter (27) is made of non-limiting material but can be made of clear pvc plastic as in the same material used in pneumatic tubes used in the banking industry in drive thru services and gives the advantage of allowing the user to see the pull string or wire as it reaches the shop vacuum hose to prevent pulling too much of the pull string or wire into the vacuum machine. The flexible conduit adapter (27) has the advantage of bending at least 180 degrees at the elbow of the adapter which allows the user to manipulate the adapter to a variety of positions in order to reach conduit that is already in place without a junction box. The flexibility is enabled by use of rigid, yet flexible rings within the pvc plastic which is of non-limiting material but can be made of thin steel. The overall length of the flexible conduit adapter (27) when placed in a 180-degree position is at least 21.9075 cm (eight and five-eighths inches) in length and at least 0.3175 cm (one-eighth inch) in thickness. The proximal end, represented as section 28, is the flexible portion of the flexible conduit adapter (27) and is at least 10.4775 cm (four and one-eighth inches) in length and at least 5.08 cm (two inches) in diameter and is designed to fit into the rear side of the flanged adapter (5) to create a near air-tight seal. The distal end is at least 6.35 cm (two and one-half inches) in length and has a variety of sections which taper to progressively smaller diameters to accommodate various sizes of conduit in use the industry. Section 29 is at least 4.92125 cm (one and fifteen-sixteenths inches) in diameter and is designed to fit inside a 5.08 cm (two inch) conduit and is at least 0.635 cm (one-quarter inch) in height. Section 30 is at least 4.28625 cm (one and eleven-sixteenths inches) in diameter and is designed to fit inside a 4.445 cm (one and three-fourths inch) conduit and is at least 0.635 cm (one-quarter inch) in height. Section 31 is at least 3.65125 cm (one and seven-sixteenths inches) in diameter and is designed to fit inside a 3.81 cm (one and one-half inches) conduit and is at least 0.635 cm (one-quarter inch) in height. Section 32 is at least 2.38125 cm (fifteen-sixteenths inch) in diameter and is designed to fit inside a 2.54 cm (one inch) conduit and is at least 0.635 cm (one-quarter inch) in height. Section 33 is at least 1.74625 cm (eleven-sixteenths inch) in diameter and is designed to fit inside a 1.905 cm (three-fourths inch) conduit and is at least 0.635 cm (one-quarter inch) in height. Section 34 is at least 1.11125 cm (seven-sixteenths inch) in diameter and is designed to fit inside a 1.27 cm (one-half inch) conduit and is at least 0.635 cm (one-quarter inch) in height. Each section (29,30,31,32,33, 34) is designed to fit into corresponding conduit sizes to create a near air-tight seal for the purpose of pulling string or wire through the conduit when attached to the flexible adapter (5) and a shop vacuum hose.

It will be readily apparent to anyone who reads this document that at least one embodiment of the Pull String Vacuum Assembly provides the advantage of creating an airtight seal over the entirety of a junction box for the purpose of pulling string or wire through new conduit or conduit with existing wiring and is not imposed by any existing wiring within a junction box or conduit. And a further advantage of the use of a standard shop vacuum hose in use in the industry without any additional attachments necessary. Although only certain embodiments were disclosed in this document, many other variations are possible. For example, the overall size of the cover plate (1), tubular rubber gasket (4), and flange (3) can be manufactured to fit any size junction box and shop vacuum hose in use in the industry. Additionally, the preferred material of the cover plate (1) and flange (3) is pvc plastic but can also be stainless steel or any other material in use in the industry. Additionally, the preferred material of the gasket (4) is tubular rubber, but can also be vinyl or silicone. Additionally, the preferred material for the flanged adapter (5) and the flexible conduit adapter (27) is clear pvc plastic, but can also be other pvc plastic or any other material in use in the industry.

Although specific features, structures, embodiments, methods, objectives, benefits, advantages, functionalities, and applications may have been disclosed, it will be understood by those having skill in the art that changes, including but not limited to, variations, modifications, combinations, alterations, omissions, and various other applications, will occur to those of ordinary skill in the art and such changes will be made without departing from the spirit and the scope of the invention as claimed. Further, it is to be understood by anyone who reads this document that the terminology and phraseology used herein are for the purpose of description and should not be considered limiting. Even further, the drawings illustrating embodiments of the present invention are used for schematic representation. The actual systems, devices, and methods of the embodiments of the present invention may depart from the foregoing schematics without departing from the spirit or the scope of the present invention.

What is claimed is:

1. A Pull String Vacuum Assembly, for attachment to an electrical junction box during installation of electrical wiring through conduit, the assembly comprising:
    a substantially planar cover plate having a front surface, a rear surface, and a central opening extending through the cover plate;

a flange extending outwardly from the front surface of the cover plate and surrounding the central opening;

a tubular gasket positioned on the rear surface of the cover plate and surrounding the central opening, the tubular gasket being configured to form a seal against the electrical junction box; and an adhesive securing the tubular gasket to the rear surface of the cover plate.

2. The pull string vacuum assembly of claim 1, wherein the cover plate is formed from polyvinyl chloride (PVC) or polycarbonate material.

3. The pull string vacuum assembly of claim 1, wherein the cover plate is rectangular or square in shape.

4. The pull string vacuum assembly of claim 1, wherein the flange is integrally formed with the cover plate as a single molded component.

5. The pull string vacuum assembly of claim 1, wherein the tubular gasket is formed from rubber, silicone, or vinyl material.

6. The pull string vacuum assembly of claim 1, wherein the adhesive comprises an industrial adhesive configured to secure the tubular gasket to the rear surface of the cover plate.

7. The pull string vacuum assembly of claim 1, wherein the removable flanged adapter is formed from transparent PVC material.

8. The pull string vacuum assembly of claim 1, wherein the stepped sections of the removable flanged adapter define progressively larger internal diameters configured to receive vacuum hoses of different sizes, wherein the pull string vacuum assembly is configured to generate vacuum airflow through electrical conduit to facilitate routing of a pull string through the electrical conduit.

9. The pull string vacuum assembly of claim 1, wherein the removable flanged adapter further includes internal stepped openings configured to receive electrical conduit of different diameters.

10. An oversized pull string vacuum cover assembly for use with oversized electrical junction boxes, the assembly comprising:

an oversized cover plate having a central opening;

a flange extending around the central opening;

a tubular gasket positioned on a rear surface of the oversized cover plate; and an adhesive securing the tubular gasket to the oversized cover plate.

11. The oversized pull string vacuum cover assembly of claim 10, wherein the oversized cover plate is rectangular or square in shape.

12. The oversized pull string vacuum cover assembly of claim 10, wherein the flange is configured to removably receive a stepped vacuum adapter.

* * * * *